2,800,434

CONCENTRATION OF AQUEOUS METHACROLEIN SOLUTION

John Howlett and Henry Robertson Archer, Tonbridge, England, assignors to The Distillers Company Limited, Edinburgh, Scotland, a British company No Drawing. Application January 25, 1952,
Serial No. 268,356

Claims priority, application Great Britain
January 30, 1951

6 Claims. (Cl. 202—40)

The present invention refers to the concentration of unsaturated aldehydes and in particular to the concentration of methacrolein from dilute aqueous solutions by distillation.

In copending United States application Serial No. 194,192, dated November 4, 1950, now Patent No. 2,766,192, there is disclosed a process for the recovery of unsaturated aldehydes in concentrated form from dilute aqueous solutions thereof by distillation, which is characterised by effecting said distillation at a pH between 5 and 8 under reduced pressure, whereby polymerisation is prevented. The distillation may be carried out in the presence of hydroquinone, the amount of which being preferably one-twentieth of the theoretical amount required for full oxygen saturation in the still feed solution.

When dilute acrolein solutions are subjected to the above defined process and the process is carried out on a larger scale, using mild steel as the material for the construction of the plant, no polymer formation was observed even after a continuous run of 35 days. Methacrolein, however, was found to tend far more readily to polymerise, and when dilute methacrolein solutions were distilled in an identical apparatus, and under conditions similar to those used for the distillation of acrolein, it was found that although no polymer was formed in the column of the still, a considerable formation of polymer occurred in the condensing equipment after a comparatively short time, which it was necessary to remove for the efficient working of the process.

It has now been discovered that the formation of polymers of methacrolein is initiated by the concentrated vapours thereof coming into contact with surfaces of materials which are capable of imparting ferrous or ferric ions to the condensate. Such materials are for instance iron or mild steel used for the construction in the larger scale plant of the vapour line, and the condensing and reflux system of the distillation equipment. By replacing these mild steel or iron parts by a material which will not impart ferrous or ferric ions to the liquid condensate the formation of polymers can be avoided practically completely. Such suitable materials are, for instance, stainless steel, Monel metal, aluminum, porcelain and suitable plastic materials.

Accordingly, the process of recovering concentrated methacrolein by distillation of dilute aqueous methacrolein solutions comprises effecting the distillation under reduced pressure at a pH value between 5 and 8 in the aqueous solution ot be distilled and, if desired, in the presence of hydroquinone, in a distillation equipment wherein the parts which come into contact with methacrolein vapour or condensate are made of stainless steel, or any other of the above mentioned materials, which are incapable of giving off iron ions.

The pressure under which the distillation is preferably carried out may vary within very wide limits, the upper limit being preferably not substantially higher than 400 mm. mercury. Its lower limit is given by economic considerations, since operating at very low pressures requires the application of refrigerated cooling liquids for the condensation of the distillate. Generally, a pressure of between 200 and 400 mm. mercury will be sufficient to carry out the distillation satisfactorily, and to prevent the formation of polymers, especially when hydroquinone is present in an amount which is only one-twentieth of that required by theory to reduce fully the oxygen contained in the still feed solution. The hydroquinone is preferably introduced into the condensation equipment and added to the condensate. A part may also be added to the still and in this case it may advantageously be introduced through the reflux.

The following example illustrates the manner in which the distillation according to the invention is carried out in practice:

*Example*

An aqueous solution of methacrolein containing 0.3% by weight of the unsaturated aldehyde was fed at the rate of 15 gals./hr., into a still comprising a mild steel stripping section 6 inches in diameter and 13 feet 8 inches long, packed with ¾-inch porcelain rings, superimposed on which was a 3-inch diameter stainless steel rectifying section 5 feet 2 inches long packed with ⅜ inch porcelain rings. The vapour line leaving this rectifying section and condensing system were also of stainless steel. During the rectification 6 ccs. per hour of a 4% solution of hydroquinone in water was fed into the inlet of the condensing system (this amount of hydroquinone is equivalent to ½₀ of the theoretical required for reduction of all the oxygen present). The system was operated at a pressure of 400 mm. Hg giving a kettle temperature of 82° C. and a still head temperature of 47° C. The product separated into two layers, the ratio of the top layer to the bottom layer being 25 to 1, the top layer containing 97.2% by weight and the bottom layer containing 7.6% by weight methacrolein. No sign of polymer could be detected after 28 days working, the stainless steel condenser system remaining perfectly bright, the column also being free from polymer.

This example was repeated at 250 mm. Hg with the same results, the kettle temperature, however, being 73° C. and the still head temperature 36° C.

Although only the use of stainless steel has been described in the above example it is to be understood that in its place Monel metal, aluminum or any of the other materials mentioned may be used as constructing material for the same parts. By the use of these materials similar advantageous results were obtained.

We claim:

1. Process which comprises distilling an aqueous methacrolein solution in a stripping section of the usual iron-containing equipment in which the iron tends to polymerize vapours of methacrolein and rectifying and condensing methacrolein vapours coming from said stripping section in equipment made of material free from iron ions, whereby polymerization of said methacrolein is substantially avoided.

2. A proceess in accordance with claim 1 in which the rectifying and condensing of the methacrolein vapours is done in equipment made of Monel metal.

3. A process in accordance with claim 1 in which the rectifying and condensing of the methacrolein vapours is done in equipment made of aluminum.

4. A process in accordance with claim 1 in which the rectifying and condensing of the methacrolein vapours is done in equipment made of porcelain.

5. A process in accordance with claim 1 in which the rectifying and condensing of the methacrolein vapours in done in equipment made of plastic material.

6. Process according to claim 1 wherein said parts of the distillation equipment are made of stainless steel.

References Cited in the file of this patent

UNITED STATES PATENTS

| | | |
|---|---|---|
| 1,773,247 | Williams | Aug. 19, 1930 |
| 2,402,133 | Gresham et al. | June 18, 1946 |
| 2,407,861 | Wolk | Sept. 17, 1946 |
| 2,446,969 | Welch | Aug. 10, 1948 |
| 2,476,391 | Stautzenberger et al. | July 19, 1949 |
| 2,478,045 | Hatch et al. | Aug. 2, 1949 |
| 2,514,966 | Pierotti et al. | July 11, 1950 |
| 2,514,967 | Pierotti et al. | July 11, 1950 |
| 2,574,935 | Pierotti et al. | Nov. 13, 1951 |

OTHER REFERENCES

Chemical Engineering, December 1947, pages 106–109, article by F. G. Watson.

Perry: Chemical Engineers' Handbook, third edition, 1950, McGraw-Hill, pages 1458–1526.